United States Patent [19]

DeJohn

[11] Patent Number: 5,655,426
[45] Date of Patent: Aug. 12, 1997

[54] TURRET END EFFECTOR FOR WATERJET HOLE CUTTING

[75] Inventor: Robert G. DeJohn, Indianapolis, Ind.

[73] Assignee: Cambridge Industries, Inc., Madison Heights, Mich.

[21] Appl. No.: 410,204

[22] Filed: Mar. 24, 1995

[51] Int. Cl.[6] .................................. B26F 1/26; B26F 3/00
[52] U.S. Cl. ............................. 83/177; 901/29; 901/41
[58] Field of Search .............................. 83/53, 177; 901/29, 901/41; 239/225.1, 237, 591; 451/2, 4, 102

[56] References Cited

U.S. PATENT DOCUMENTS

| | | | |
|---|---|---|---|
| 3,326,607 | 6/1967 | Book | 299/58 |
| 3,526,162 | 9/1970 | Willcox | 83/177 X |
| 4,686,877 | 8/1987 | Jaritz et al. | 83/53 X |
| 4,776,230 | 10/1988 | Susnjara | 901/29 X |
| 4,827,679 | 5/1989 | Earle, III | 83/177 X |
| 4,903,559 | 2/1990 | Landeck | 83/24 |
| 4,966,059 | 10/1990 | Landeck | 83/53 |
| 5,083,487 | 1/1992 | Croteau | 83/177 X |
| 5,088,171 | 2/1992 | Suzuki | 901/41 X |
| 5,162,016 | 11/1992 | Malloy | 83/53 X |
| 5,165,829 | 11/1992 | Ross et al. | 901/41 X |
| 5,305,653 | 4/1994 | Ohtani et al. | 901/29 X |
| 5,339,715 | 8/1994 | Coleman | 83/177 X |
| 5,367,929 | 11/1994 | Burch et al. | 83/177 |

*Primary Examiner*—Eugenia Jones
*Attorney, Agent, or Firm*—Reising, Ethington, Barnard & Perry

[57] ABSTRACT

An interface for incorporation between an articulated arm robot and a cutting nozzle for cutting a circular opening in a workpiece. The interface includes apparatus for moving the cutting nozzle independently of the arm robot. The interface includes a first moving mechanism for moving the cutting device linearly to an offset position with respect to an axis extending through a center of the opening to be cut, and a second moving mechanism for moving the offset cutting nozzle in a circular path around the axis to cut the opening.

9 Claims, 3 Drawing Sheets

TURRET END EFFECTOR FOR WATERJET HOLE CUTTING

FIELD OF THE INVENTION

The present invention relates generally to the field of cutting systems; and, more particularly, to a waterjet cutting system for cutting holes or other curved shapes in a workpiece.

BACKGROUND OF THE INVENTION

Waterjet cutting systems are used to effect cuts in a variety of materials. For example, U.S. Pat. No. 3,326,607 discloses an apparatus for boring a tunnel through rock by moving a waterjet cutting nozzle around an axis of rotation of a motor. Also, U.S. Pat. Nos. 4,903,559 and 4,966,059 disclose an arc-cutting tool using a waterjet to make arc cuts on an edge of a continuously moving sheet.

It is also known to mount a waterjet cutting nozzle to the end of an articulated arm robot in order to cut large and irregular-shaped holes in sheet material such as plastic panels. Such systems provide a great deal of flexibility in processing panels of different sizes and geometries; and, in addition, adapt well to engineering changes in the product for which the panel is being fabricated.

One limitation of robotic waterjet cutting systems, however, is in the cutting of small circular holes. Typically, robotic waterjet cutting systems are used only in cutting holes having a diameter of more than three-eighths-inch. The reason for this limitation is due to the speed at which a robot controller can process the information needed to coordinate all of its axes of movement to produce a circular path. Generally, to cut a hole using a robotic waterjet cutting system, the robot path speed must be set at about twenty percent (20%) or less of the nominal cutting speed of the waterjet to produce a circular path of acceptable tolerance. Any speed higher than this will produce a hole with an excessive amount of ovality; and the smaller the diameter of the hole to be cut, the worse the ovality condition becomes.

Accordingly, although robotic waterjet cutting systems have significantly improved panel processing speeds where large openings are required, it is not presently feasible to replace traditional drilling methods with waterjet cutting methods in cutting small diameter holes of three-eighths inch or less; and this limitation directly impacts the ability to implement flexible manufacturing techniques utilizing such systems in many applications.

SUMMARY OF THE INVENTION

The present invention provides a cutting system for cutting holes and other curved shapes; and, in particular, provides a cutting system which includes a cutting tool mounted to the end of an articulated arm robot that is effective in cutting small circular holes and other curved shapes of reduced radius of curvature.

A cutting system according to the present invention includes an articulated arm robot having a plurality of movements, a cutting tool movable by the articulated arm robot for cutting a workpiece, and an interface connected between the arm robot and the cutting tool and including a mechanism for moving the cutting tool independently of the plurality of movements of the arm robot.

The cutting system of the present invention provides the advantages of robotic cutting systems including increased flexibility and adaptability, and reduced tooling costs and space requirements. In addition, the cutting system of the present invention provides the further advantage of permitting small circular holes having a diameter of, for example, three-eighths of an inch or less and other curved shapes having a small radius of curvature to be cut accurately and reliably and at an increased speed.

According to a presently preferred embodiment of the invention, the moving mechanism of the interface includes a first linear moving mechanism for moving the cutting tool linearly to a position offset with respect to an axis extending through the center of curvature of a curved shape to be cut, and a second rotary moving mechanism for moving the cutting tool along a curved path around the center of curvature to cut the curved shape, the first and second moving mechanisms both moving the cutting tool independently of the plurality of movements of the arm robot.

To use the cutting system of the present invention to cut a curved shape, such as a circular hole of a desired diameter, in a workpiece, the arm robot is programmed to move the cutting tool to a position to aim the cutting tool at the center of the hole to be cut and at a perpendicular attitude with respect to the surface of the workpiece. Thereafter, the first linear moving mechanism of the interface is operated to move the cutting tool linearly from the center of the hole to be cut by an offset distance corresponding to the radius of the hole to be cut. The second rotary moving mechanism of the interface is then operated to cause the cutting tool to move in a circular path around the axis to cut the hole.

With the present invention, the speed of the rotary movement of the cutting tool can be selected to match the optimum cutting speed of the tool. This results in a very accurate circular hole being cut at four to five times the speed of a conventional robotic waterjet cutting system.

Productivity of the hole cutting can be further enhanced by programming the robot controller to make interface radius changes while the robot is in transit between holes. The result is a system for drilling without using drill bits, tool changers, or back-up bushings.

In a presently preferred embodiment, the cutting tool comprises a waterjet cutting tool having a waterjet nozzle, for delivering a high pressure flow of a cutting fluid to a surface of the workpiece. The invention, however, is not limited to waterjet cutting tools, and other cutting tools such as laser cutting tools can also be used.

Further features and advantages of the present invention will become apparent from the drawings and detailed description that follow.

DETAILED DESCRIPTION OF THE PREFERRED EMBODIMENT

Figure 1:
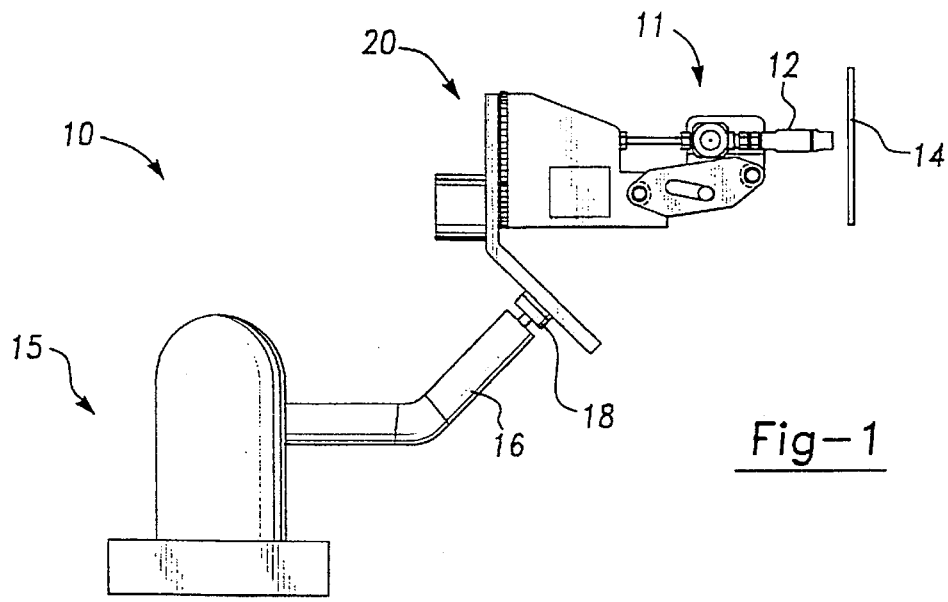
FIG. 1 is a side view schematically illustrating a waterjet cutting system according to a presently preferred embodiment of the invention.

FIG. 1 schematically illustrates a waterjet cutting system according to a presently preferred embodiment of the invention. The cutting system is generally designated by reference number 10 and is particularly designed to cut a hole or other curved shape in a workpiece 14.

Cutting system 10 generally includes a computer-controlled, six-axis, articulated arm robot 15 having a robotic arm 16 coupled to a robotic wrist 18 for supporting and positioning a cutting tool 12 of a cutting device 11 in a cutting relationship with respect to the workpiece 14. In addition, system 10 includes an interface unit 20 incorporated between robotic arm 16 and cutting device 11 for providing independent control over the positioning of cutting tool 12 of the cutting device 11 with respect to the positioning provided by arm robot 15.

The arm robot 15 may be of conventional type and, therefore, is not described in detail herein.

In the preferred embodiment described herein, cutting device 11 comprises a waterjet cutting device having a cutting tool comprising a waterjet cutting nozzle 12; and, as described previously, the mounting of a waterjet cutting device to the end of an articulated arm robot is known and is generally effective in cutting holes or other curved shapes in a workpiece.

As will be described in detail hereinafter, interface unit 20 permits positioning of cutting nozzle 12 with respect to the workpiece 14 independently of and in addition to any positioning provided by the arm robot 15, and permits the cutting nozzle 12 to be used to accurately cut holes and other curved shapes of small diameter. In general, the interface unit provides an offset movement of the cutting nozzle by a distance equal to a radius of an arc or a circular hole to be cut in workpiece 14; and a rotary movement of the cutting nozzle about a rotation axis which is substantially perpendicular to a surface of the workpiece and which coincides with the center point of the arc or hole to be cut.

Figure 2:
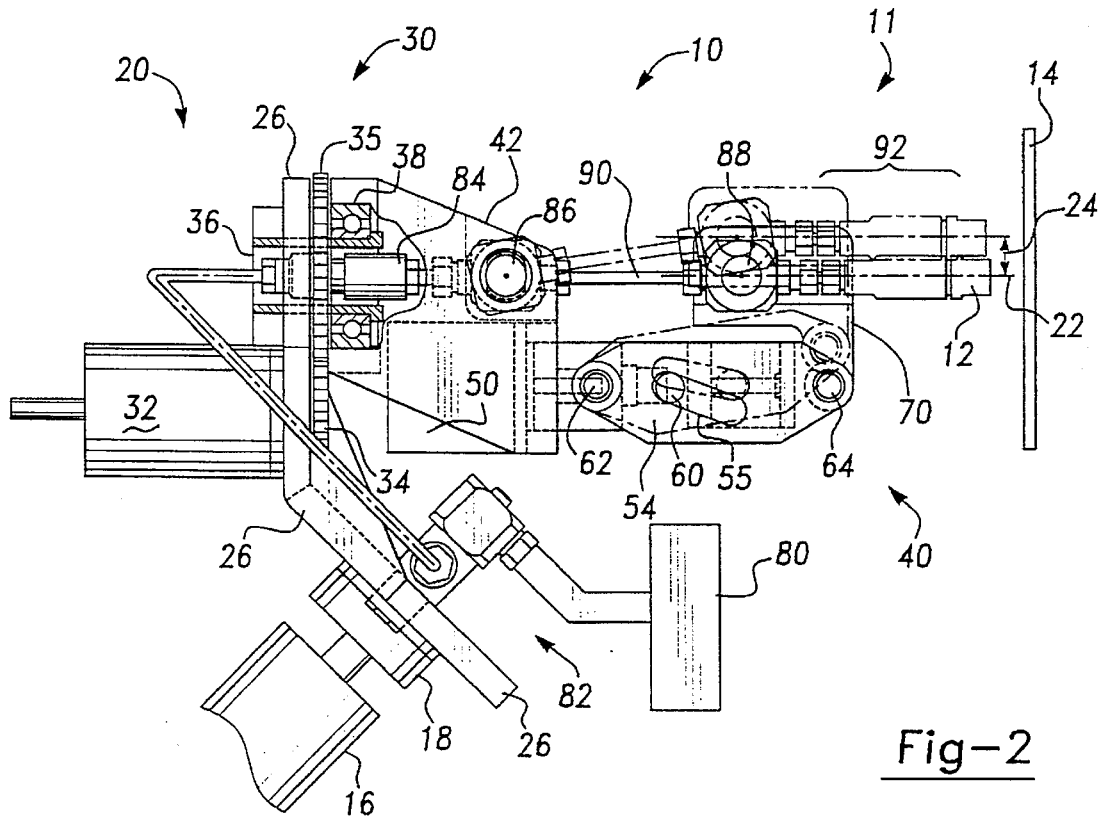
FIG. 2 illustrates a portion of the system of FIG. 1 with a portion thereof broken away.
Figure 3A:
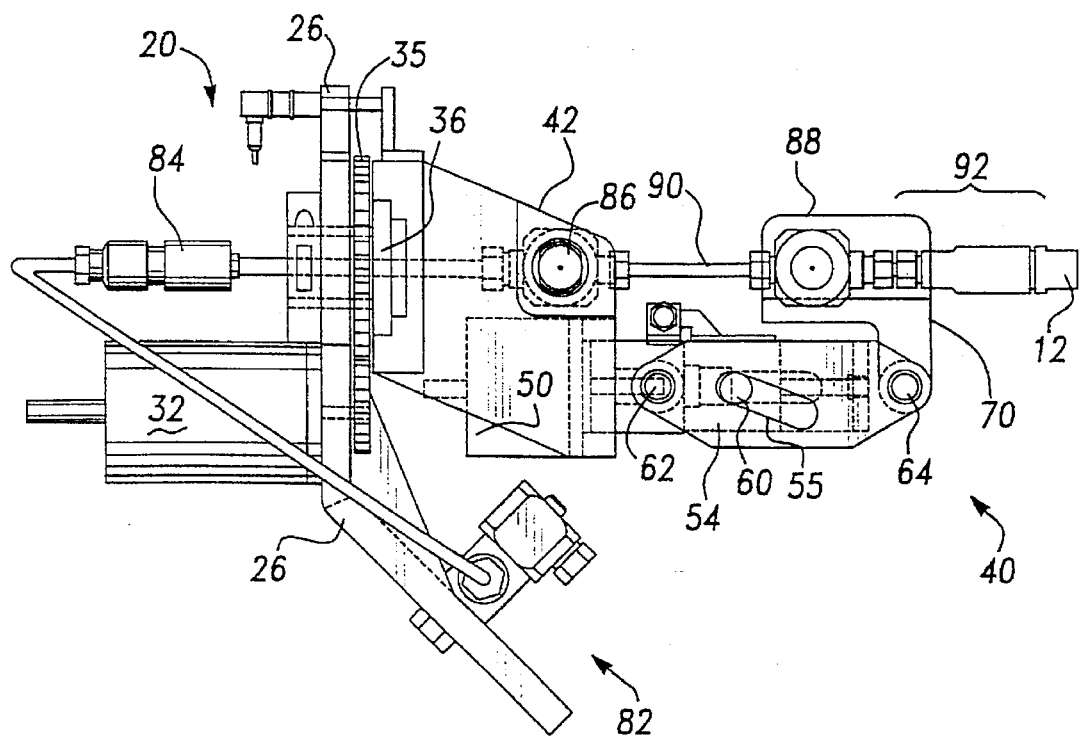
FIGS. 3A and 3B illustrate the portion of a system such as illustrated in FIG. 2 in separated form for greater clarity.
Figure 3B:
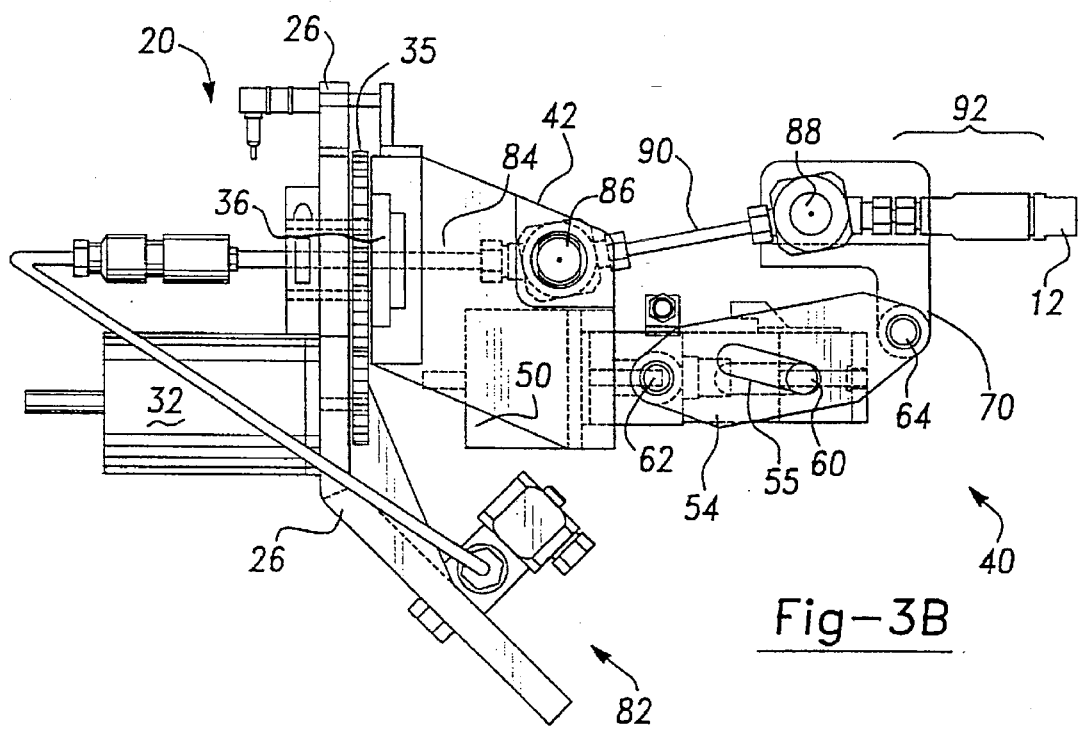

FIG. 2 illustrates a portion of the cutting system of FIG. 1 showing the interface unit 20 and cutting nozzle 12 in solid line with the cutting nozzle at an offset radius of zero; and in dotted line with the cutting nozzle offset to a radius of a curved shape to be cut. FIGS. 3A and 3B illustrate the same positions of the interface unit and cutting nozzle in separate view for greater clarity. As shown in FIGS. 2, 3A and 3B, interface unit 20 generally includes an interface mounting bracket 26, a nozzle rotation unit 30, a turret nozzle offset unit 40, and a nozzle mounting unit 70.

Nozzle rotation unit 30 further includes a nozzle rotation stepper motor 32, a drive gear 34, a driven gear 35, a hollow stub shaft 36 and a bearing 38. Nozzle rotation stepper motor 32 is fixedly mounted to interface bracket 26. A drive shaft of nozzle rotation stepper motor 32 protrudes through an opening in interface bracket 26, thereby allowing drive gear 34 to be mounted on the drive shaft of nozzle rotation stepper motor 32 on the opposite side of interface bracket 26. Hollow stub shaft 36 is fixedly mounted to the interface bracket 26 and protrudes through interface bracket 26.

Turret nozzle offset unit 40 is rotatably mounted to hollow stub shaft 36 using ball bearing 38 and conventional bearing mounting structure. Driven gear 35 is fixedly attached to nozzle unit offset mount 42 and has an aperture formed therethrough for receiving hollow stub shaft 36 without contacting shaft 36. A portion of the teeth of driven gear 35 are meshed with a portion of the teeth of drive gear 34. Although gears 34 and 35 are shown exposed in FIGS. 2 and 3 to aid in understanding the construction and operation of interface unit 20, in actual use a safety cover or guard may be placed over the gears 34 and 35. Preferably, drive gear 34 and driven gear 35 are spur gears; however, alternatively, these spur gears of the gear train can be replaced by other gear configurations. Also, it is contemplated that the gear train described above could be replaced with either a belt or chain drive system.

Upon energizing nozzle rotation stepper motor 32, rotational force is transmitted via a shaft of motor 32 to drive gear 34. A portion of the teeth of drive gear 34 engage a portion of the teeth of driven gear 35 causing nozzle offset unit mount 42 to rotate about rotation axis 22.

Figure 4:
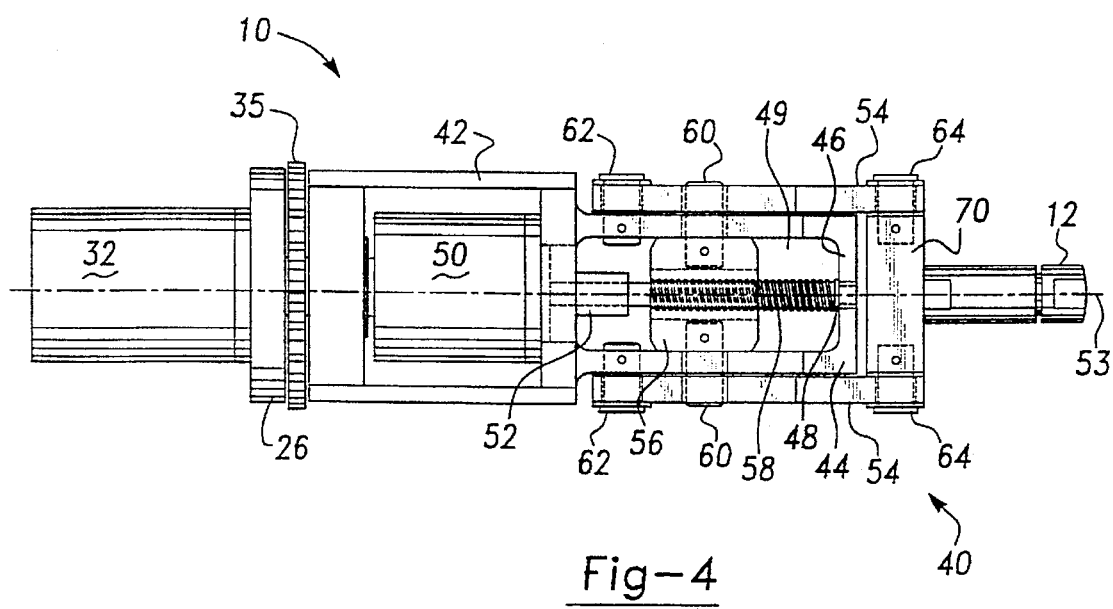
FIG. 4 illustrates a top view of an interface of the invention.

As shown in FIG. 4, nozzle offset unit mount 42 includes an elongated U-shaped section 44 having a base section 46. Base section 46 includes an aperture for receiving a screw drive bearing 48.

In addition, nozzle offset unit 40 further includes a nozzle offset stepper motor 50, a pair of pivot links 54, a slide block 56, a screw drive 58, a plurality of slide block pins 60, and a plurality of mounting pins 62 and 64. Screw drive 58 is, preferably, a shaft having a threaded mid-portion and having non-threaded end portions. Slide block 56 includes an aperture passing therethrough having threads that engage the threaded mid-portion of screw drive 58. One of the non-threaded end portions of screw drive 58 is rotatably mounted in screw drive bearing 48, which in turn is mounted in base section 46 of elongated U-shaped section 44 of nozzle offset unit 40. The other non-threaded end portion of screw drive 58 is coupled to a shaft 52 of nozzle offset stepper motor 50, preferably with a slip collar, or sleeve, keyed to shaft 52 and to the adjacent non-threaded end of screw drive 58.

Slide block 56 includes a plurality of slide block pins 60 extending from slide block 56 at an angle substantially perpendicular to screw drive 58. As shown in FIG. 2, slide block pins 60 slidably engage diagonal slots 55 of pivot links 54. Nozzle offset stepper motor 50 of nozzle offset unit 40 is fixedly mounted to nozzle rotation offset unit mount 42. Shaft 52 of nozzle offset stepper motor 50 protrudes through an opening in nozzle offset unit mount 42, and shaft 52 of nozzle offset stepper motor 50 is coupled to screw drive 58 as described above.

Referring to FIGS. 2–4, upon actuation of nozzle offset stepper motor 50, shaft 52 of nozzle offset stepper motor 50 begins to rotate causing the screw drive 58 to rotate therewith. By rotating screw drive 58, the external threads of screw drive 58 engage the internal threads of slide block 56 to cause linear movement to slide block 56 along a rotation axis 53 of shaft 52 of stepper motor 50. This linear movement of slide block 56 along rotation axis 53 causes slide block pins 60 to slide along a surface defined by diagonal slots 55 of pivot links 54 to cause rotational movement of pivot links 54 about an axis passing through a center of mounting pins 62. Nozzle mounting unit 70 is pivotally attached to pivot links 54 via a pair of mounting pins 64. Thus, any rotational movement of pivot links 54 about mounting pins 62 causes nozzle mounting unit 70 carrying cutting nozzle 12 to be offset a linear distance from rotation axis 22, as shown in FIG. 2.

The speed at which the desired offset of cutting nozzle 12 from rotation axis 22 can be achieved is dependent, for example, upon the pitch of the threads of the screw drive 58 and the rotation speed of nozzle offset stepper motor 50. Furthermore, the accuracy in which the cutting nozzle 12 can be positioned at a desired offset from rotation axis 22 will be dependent, for example, upon the resolution of nozzle offset stepper motor 50 and the backlash between the internal threads of slide block 56 and the external threads of screw drive 58.

Preferably, once an offset radius of cutting nozzle 12 from rotation axis 22 is complete, nozzle offset unit 40 is rotated by the actuation of nozzle rotation stepper motor 32 in the manner described above. When cutting is desired, a cutting fluid, such as water, is transmitted to cutting nozzle 12 and delivered at high pressure to a surface of workpiece 14. As shown in FIG. 2, a high pressure water source 80 is coupled to cutting nozzle 12 via a water passage 82, which includes internal water passages, conduits and a series of commercially available high-pressure swivel fittings. A high-pressure swivel fitting 84 is coupled to an internal water passageway of hollow stub shaft 36 to allow cutting device 11 to rotate about rotation axis 22 without damaging water passage 82. Swivel fitting 84 is also coupled to a tube 90, which, in turn, is coupled to nozzle adapter 92. Nozzle 12 is replaceably coupled to nozzle adapter 92. The rotation direction of turret nozzle offset unit 40 about rotation axis 22 will preferably alternate from clockwise to counter clockwise for each hole or curve which is cut into workpiece 14 to prevent the electrical cables coupled to nozzle offset stepper motor 50 from wrapping around the nozzle rotation unit 30.

The system, apparatus, and method of the present invention is particularly useful for precision cutting of holes from about one and one-half (1½) inches in diameter down to about one-eighth (⅛) inch in diameter. To effect such cutting, the arm robot 15 is programmed to position cutting nozzle 12 with rotation axis 22 at the center of the hole location in workpiece 14 and at an angle perpendicular to the attitude of the workpiece surface (as shown in solid line in FIG. 2 and in FIG. 3A). Nozzle offset stepper motor 50 is then actuated to effect the desired radius 24 of the hole or arc to be cut in workpiece 14 by offsetting the axis of cutting nozzle 12 a distance 24 with respect to rotation axis 22. Thereafter, nozzle rotation stepper motor 32 is actuated to transmit rotary motion to cause cutting nozzle 12 to be rotated about rotation axis 22. The speed of the rotary motion is desirably matched to the optimum cutting speed of cutting nozzle 12. It is estimated that implementation of system 10 in cutting such holes will result in a very accurate circular hole or other curved shape being cut at four to five times the speed of a conventional robotic waterjet system.

The productivity of the hole cutting can be further enhanced by programming the robot controller to make turret radius changes while the robot is in transit between holes.

Thus, the present invention provides a cutting system for drilling without using drill bits, tool changers, or back-up bushings. Although the system is preferably used for cutting arcs and circular holes, it is contemplated that articulated robot 15 of system 10 shown in FIG. 1 may be actuated to cause movement at one or more of the six axes of arm robot 15 during the execution of the linear and/or circular motions provided by interface 20 to effect simple or complex non-circular cuts.

Although the invention has been described with reference to preferred embodiments, those skilled in the art will recognize that changes may be made in form and in detail without departing from the spirit and scope of the following claims.

What is claimed is:

1. A cutting system, comprising:

an articulated arm robot having a plurality of movements;

a cutting device movable by said articulated arm robot for cutting a workpiece, said cutting device comprises a curing tool for curing a curved shape in said workpiece; and an interface connected between said arm robot and said cutting device, said interface including a mechanism for moving said cutting device independently of said plurality of movements of said arm robot, wherein said moving mechanism comprises a first moving mechanism for moving said cutting tool to a position offset with respect to an axis extending through a center of curvature of a curved shape to be cut, and a second moving mechanism for moving said cutting tool along a curved path around said axis to cut said curved shape.

2. The cutting system of claim 1 wherein said cutting tool comprises a cutting nozzle for delivering a high pressure flow of cutting fluid.

3. The cutting system of claim 2 further comprising a source for supplying a flow of cutting fluid via a fluid passage to said cutting nozzle.

4. The cutting system of claim 1 wherein said first moving mechanism comprises:

a mounting member coupled to said second moving mechanism;

a first motor mounted to said mounting member, said first motor having a rotatable shaft;

a pivoting member coupled to said mounting member, and said cutting tool being coupled to said pivoting member; and an actuation device coupled between said shaft of said first motor and said pivoting member, said actuation device translating a rotational motion of said shaft into a linear movement of said tool when said shaft of said first motor is rotated.

5. The cutting system of claim 4 wherein said second moving mechanism comprises:

a mounting bracket fixedly coupled to said articulated arm robot, and said mounting member being rotatably coupled to said mounting bracket;

a second motor fixedly mounted to said mounting bracket, said second motor having a rotatable shaft; and a drive system coupled between said shaft of said second motor and said mounting member to transmit a rotational force from said shaft of said second motor to said mounting member to cause a rotational movement of said cutting tool.

6. The cutting system of claim 5 wherein said drive system comprises:

a drive gear coupled to said shaft of said second motor; and a driven gear coupled to said mounting member, said driven gear being positioned in an engaging relationship with said drive gear.

7. The cutting system of claim 5 wherein said first motor and said second motor each comprise a stepper motor.

8. A cutting system, comprising:

a fluid source for supplying a flow of a cutting fluid;

a cutting nozzle for delivering a high pressure flow of said cutting fluid;

a fluid passage for coupling said fluid source to said cutting nozzle;

an articulated arm robot having a plurality of movements;

a mounting bracket fixedly coupled to said arm robot;

a rotation motor fixedly mounted to said mounting bracket, said rotation motor having a rotatable shaft;

a mounting member rotatably coupled to said mounting bracket;

a drive system coupled between said shaft of said rotation motor and said mounting member to transmit a rotational force from said shaft of said rotation motor to said mounting member to cause a rotational motion of said mounting member;

an offset motor mounted to said mounting member, said offset motor having a rotatable shaft;

a pivoting member coupled to said mounting member, and said cutting nozzle being coupled to said pivoting member; and an actuation device coupled between said shaft of said offset motor and said pivoting member, said actuation device translating a rotational motion of said shaft of said offset motor into a linear movement of said cutting nozzle when said shaft of said offset motor is rotated.

9. The cutting system of claim 8, wherein said fluid comprises water.

* * * * *

UNITED STATES PATENT AND TRADEMARK OFFICE
CERTIFICATE OF CORRECTION

PATENT NO. : 5,655,426
DATED : August 12, 1997
INVENTOR(S) : Robert G. Dejohn

It is certified that error appears in the above-indentified patent and that said Letters Patent is hereby corrected as shown below:

In the Claims

In column 5, line 62, delete "curing tool for curing" and insert therefore -- cutting tool for cutting --.

Signed and Sealed this

Twenty-third Day of June, 1998

Attest:

BRUCE LEHMAN

Attesting Officer       Commissioner of Patents and Trademarks